United States Patent Office 2,894,966
Patented July 14, 1959

2,894,966

PROCESS FOR THE PREPARATION OF STABILIZED ORGANOTITANIUM COMPOUNDS

Charles A. Russell, Fair Haven, N.J., assignor to National Lead Company, New York, N.Y., a corporation of New Jersey No Drawing. Application July 10, 1956
Serial No. 596,833

6 Claims. (Cl. 260—429.5)

This invention relates to aminoalcohol titanates and zirconates. More specifically, this invention relates to a method and means for stabilizing such titanates and zirconates against hydrolysis or decomposition under conditions where they are normally unstable.

This application is a continuation-in-part of my application Serial No. 355,160, filed May 14, 1953, now abandoned.

Because of their unique properties, the aminoalcohol titanates and zirconates have evoked considerable interest in various branches of the chemical and allied industries. They have been found to be useful, for example, in various textile and cosmetic applications, and in other fields where it is necessary or desirable to treat organic materials with titanium or zirconium compounds in aqueous media. Among the aminoalcohol titanates and zirconates are included the only known water-soluble non-polar organic compounds of titanium and zirconium (excluding, for example, the titanium and zirconium salts of carboxylic acids), and these in particular lend themselves admirably to a variety of such uses.

Difficulty has occasionally been experienced, however, in that the titanates and zirconates in question, while most of them are soluble in aqueous media around the neutral point, tend to hydrolyze or decompose at pH's above about 9. Moreover, some of the aminoalcohol titanates and zirconates are not stable in aqueous solution at all. Furthermore, while most titanium and zirconium compounds other than the aminoalcohol esters form stable solutions only at low pH's, for example below 7 and in most cases only below about 3, one of the useful properties of the aminoalcohol titanates and zirconates is that they are acid-decomposable, i.e. while stable at pH's near or slightly above the neutral point, they hydrolyze at pH's below about 7.5 to give hydrous oxides of titanium. This property enables them to be subjected to controlled decomposition under conditions of acidity not practical with titanium and zirconium compounds other than the aminoalcohol esters.

It is an object of this invention, therefore, to provide aminoalcohol titanate and zirconate compositions which are stable in alkaline aqueous media. It is a further object to provide such compositions which are stable in alkaline or neutral aqueous media but decompose in acidic media.

Other objects and advantages will become apparent from the following more complete description and claims.

In its broadest aspects this invention contemplates a stabilized solution of an aminoalcohol ester of titanium or zirconium, comprising in addition to said ester, a compound selected from the group consisting of inositol, sucrose and a saturated polyhydroxy straight chain aliphatic alcohol containing from 3 to 6 alcoholic hydroxy groups and from 3 to 7 carbon atoms, the number of alcoholic hydroxy groups not exceeding the number of carbon atoms, said polyhydroxy alcohol selected from the group consisting of unsubstituted polyhydroxy alcohol and substituted polyhydroxy alcohol, the substituent in said substituted polyhydroxy alcohol being an aldehydo group substituted for one terminal carbinol group of said polyhydroxy alcohol.

This invention also contemplates a method of stabilizing an aminoalcohol ester of titanium or zirconium which comprises adding thereto the polyhydroxy compounds described above.

The aminoalcohol titanates or zirconates which may be employed in the practice of the present invention are the titanate and zirconate esters of aminoalcohols which have the formula:

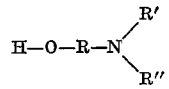

wherein R is selected from the group consisting of ethylene and alkyl-substituted ethylene radicals, and R' and R" are selected from the group consisting of hydrogen, alkyl hydrocarbon groups, β-aminoalkyl and β-hydroxyalkyl radicals, the alkyl group in the alkyl-substituted ethylene radicals, the alkyl hydrocarbon groups, the β-aminoalkyl and the β-hydroxyalkyl radicals being lower alkyls.

The polyhydroxy aliphatic alcohols especially preferred in the practice of this invention are those which are saturated and contain from 3 to 6 alcoholic hydroxy groups and contain from 3 to 7 carbon atoms. The number of alcoholic hydroxy groups should not exceed the number of carbon atoms. They may also be either substituted or non-substituted, and the substituent in the substituted polyhydroxy alcohol is an aldehydo group for one of the terminal carbinol groups in the polyhydroxy alcohol. Among the non-substituted compounds which are the most useful are hexitols, derived from the various monosaccharides, for example, sorbitol, mannitol, dulcitol and other aliphatic polyols such as glycerol, 1,2,3-butanetriol, arabitol, adonitol and the like. Among those which are substituted by an aldehydo group for a terminal carbinol group include monosaccharides and the simple derivatives such as glucose, mannose, α-methylglucoside, N-methylglucamine and the like.

The stabilized aminoalcohol titanate and zirconate compositions of the present invention may be prepared in a variety of ways that will suggest themselves to those skilled in the art. Merely adding the polyhydroxy stabilizing compound to the aminoalcohol titanate suffices when the latter is in the pure (i.e. undissolved) state, or in aqueous solution at a pH tolerable to the unstabilized compounds. A particularly convenient and desirable method of operation, however, is to combine the initial preparation with the stabilization of the aminoalcohol ester, by reacting an aminoalcohol with an alkyl orthoester of titanium or zirconium, adding the stabilizer to the resulting mixture and evaporating off the alcohol liberated in the reaction between the alkyl ester and the aminoalcohol, replacing the evaporated alcohol with enough water to dissolve the stabilized aminoalcohol titanate. The water may be added at any point after the initial reaction, except when the particular aminoalcohol ester produced is unstable in neutral aqueous solution, in which case the water must be added with or after the addition of the stabilizer. To minimize the volumes that must be handled, it is especially advantageous to incorporate the water gradually during the evaporation of the liberated alcohol.

The effective amounts of the stabilizing agents will vary to some degree depending upon the stabilizing agents used. In general, the stabilizers containing more hydroxyl groups are proportionately more effective than those with fewer. Thus, to render the aminoalcohol ester solutions stable at pH's in the neighborhood of 11, only about 15 mol percent of agents such as sorbitol or gluconic acid is required (the percentage being reckoned on the sum of the stabilizer and the aminoalcohol ester present), while up to 75 mol percent of an agent such as glycerol may be required to achieve the same effect. Smaller quantities of the agents mentioned will stabilize to a correspondingly smaller degree, so that if it is desired to stabilize only to a pH of, say, 9.5 or 10, the required amount of polyhydroxy compound will be smaller, and even amounts as low as 5 mol percent or less are effective to a noticeable degree in many instances. In general, it is preferred to use a moderate excess of the stabilizing agent over the amount absolutely required, and even large excesses may be used if desired, without any particular disadvantage, except that they may render the ester more stable than desired for a particular application.

The following examples are presented to illustrate more fully the nature and manner of practicing the present invention.

*Example I*

An ethanolamine titanate was prepared by adding 61.1 parts (1 mol) of ethanolamine to 71.1 parts (0.25 mol) of isopropyl titanate. Heat was evolved and the mixture became reddish brown. To this product were added added 23.9 parts (0.12 mol) of sorbitol hemihydrate, $C_6H_{14}O_6 \cdot \frac{1}{2}H_2O$ dissolved in 100 ml. of water. The mixture was then stirred and heated to approximately 80° C. during which time the sorbitol precipitated to some degree converting the mixture to a thin paste. Heating was continued until all of the isopropyl alcohol was given off while simultaneously adding sufficient water to keep the volume approximately constant. The total amount of water added was roughly 500 ml. After approximately 1½ hours heating, substantially all of the isopropyl alcohol had been driven off and replaced by water, and the solution was clear. This stabilized ethanolamine titanate composition was stable at any pH between approximately 6 and 11 in high dilute aqueous solution (roughly 1 part of triethanolamine titanate solution to 500 of water by volume). An unstabilized ethanolamine titanate prepared as above but without the addition of sorbitol was unstable over the entire pH range, and could not be kept in aqueous solution regardless of the acidity or alkalinity thereof.

*Example II*

A stabilized diisopropanolamine titanate solution was prepared according to a procedure similar to that described in Example I except that the starting materials were 170 parts (0.5 mol) butyl titanate, 133 parts (1 mol) of diisopropanolamine, and 18.2 parts (0.1 mol) of mannitol which was substituted for the sorbitol of Example I. The finished stabilized titanate again formed a clear solution which was stable under conditions of high dilution with water over a pH range of 5.5 to 14.

*Example III*

A triethanolamine titanate composition was prepared by adding 0.7 mol of isopropyl titanate to 0.7 mol triethanolamine. This composition was stabilized by adding thereto 0.3 mol of inositol, according to a procedure similar to that described in Example I. Isopropyl alcohol was evaporated and replaced with water as above described, and the product was again a clear solution. This solution was stable at dilution to approximately 1 part of solution to 10 parts of water, from a pH of 5 to approximately 12.5.

*Example IV*

Example III was repeated but substituting 0.7 mol of glycerol for the inositol. The resulting stabilized composition was stable at great dilution (about 1 part titanate to 500 parts water) over a pH range from about 6.5 to about 11.5.

*Example V*

The procedure of Example III was again repeated but substituting 0.7 mol of glucose for the inositol. The resulting stabilized titanate was stable in aqueous solution at a dilution of approximately 1 part titanate to 10 parts water by a volume over a pH range from approximately 5 to approximately 12.5.

*Example VI*

The procedure of Example I was repeated, but substituting 81.9 parts (0.25 mol) of isopropyl zirconate for the isopropyl titanate of Example I and 74.5 parts (0.5 mol) of triethanolamine in place of the ethanolamine of Example I. To the resulting triethanolamine zirconate composition were added 23.9 parts (0.12 mol) of sorbitol dissolved in 600 ml. of water, and the mixture was stirred and heated to drive off isopropyl alcohol as described in Example I. The resulting stabilized triethanolamine zirconate was stable in dilute aqueous solution over a pH range of 4 to 12.

*Example VII*

A stabilized β-aminoethylethanolamine titanate composition was prepared according to the procedure described in Example I using 142.1 parts (0.5 mol) isopropyl titanate, 208.3 parts (2 mols) β-aminoethylethanolamine, and 36.4 parts (0.2 mol) of mannitol. The resulting stabilized titanate was stable in dilute aqueous solution over a pH range of approximately 6 to 13.

*Example VIII*

To illustrate the dependency of the pH range over which stable solutions may be obtained upon the quantity of polyol stabilizer added, two identical preparations of triethanolamine titanate were prepared by adding in each case 28.4 parts (0.1 mol) of tetraisopropyl titanate to 14.9 parts (0.1 mol) of triethanolamine. To one of the resulting triethanolamine titanate preparations was added 3.8 parts (0.02 mol) of sorbitol, and the free isopropyl alcohol was driven off as described in Example I. The resulting stabilized composition was stable in dilute aqueous solution over a pH range of 6 to approximately 12. To the other triethanolamine titanate preparation was added 16.3 parts (0.085 mol) of sorbitol, and the same procedure repeated. This second stabilized product was found to be stable, when tested under the same conditions as the first, over a pH range of 4 to above 14.

*Example IX*

The procedure of Example III was repeated except that 0.3 mole of N-methylglucamine was substituted for 0.3 mole of inositol. The resulting solution was stable between a pH of approximately 5.0 to a pH of more than 13.

*Example X*

The procedure of Example II was repeated except that 1.0 mole of N-ethyldiethylanolamine was substituted for the diisopropanolamine. The resulting solution was stable between a pH of about 6.0 and 12.5.

*Example XI*

The procedure of Example III was again repeated except that 0.35 mole of sucrose was substituted for 0.3 mole of inositol. The results were substantially the same as that obtained in Example III.

The process and products of the present invention provide stabilized aminoalcohol titanates and zirconates which may be stored and used under conditions where the ordinary aminoalcohol titanates and zirconates are spontaneously decomposed. In particular, aminoalcohol titanates and zirconates stabilized according to the present invention may be employed in aqueous media at pH values which would cause immediate hydrolysis of unstabilized aminoalcohol titanates and zirconates. As shown in the examples, even aminoalcohol titanates and zirconates which cannot ordinarily be kept in aqueous solution at all form stable solutions which resist hydrolysis over a broad pH range when treated according to this invention. The degree of stability and, for example the breadth of the stable pH range, may be controlled at will be varying the quantity of stabilizer used.

Stabilized aminoalcohol titanates and zirconates according to the present invention are useful in a variety of ways, for example in the treatment of textile fibers under conditions where the acidity or alkalinity required in the treatment process renders ordinary titanium and zirconium compounds unstable and unusable, and in many other processes where it is desired to employ titanium solutions in aqueous systems and the acidity or alkalinity of the system is controlled by other factors such as operator hazard, nature of the material treated, etc.

While this invention has been described and illustrated by the examples shown, it is not intended to be strictly limited thereto, and other variations and modifications may be employed within the scope of the following claims.

I claim:
1. Method for the preparation of a new stabilized composition of matter which comprises reacting an aminoalcohol ester of a metal selected from the group consisting of titanium and zirconium with a compound selected from the group consisting of inositol, sucrose and a saturated polyhydroxy straight chain aliphatic alcohol containing from 3 to 6 alcoholic hydroxy groups and from 3 to 7 carbon atoms, the number of alcoholic hydroxy groups not exceeding the number of carbon atoms, said polyhydroxy alcohol selected from the group consisting of unsubstituted polyhydroxy alcohol and substituted polyhydroxy alcohol, the substituent in said substituted polyhydroxy alcohol being an aldehydo group substituted for one terminal carbinol group of said polyhydroxy alcohol, said aminoalcohol of said aminoalcohol ester having the formula:

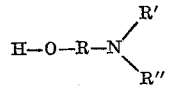

wherein R is selected from the group consisting of ethylene and alkyl-substituted ethylene radicals, and R' and R'' are selected from the group consisting of hydrogen, alkyl hydrocarbon groups, β-aminoalkyl and β-hydroxyalkyl radicals, the alkyl group in the alkyl-substituted ethylene radicals, the alkyl hydrocarbon groups, the β-aminoalkyl and the β-hydroxyalkyl radicals being lower alkyls.

2. Method according to claim 1 in which said aminoalcohol ester is a titanate of triethanolamine.
3. Method according to claim 1 in which said polyhydroxy alcohol is sorbitol.
4. Method according to claim 1 in which said polyhydroxy alcohol is manitol.
5. Method according to claim 1 in which said polyhydroxy alcohol is sucrose.
6. Method according to claim 1 in which said polyhydroxy alcohol is glucose.

References Cited in the file of this patent
UNITED STATES PATENTS

| | | |
|---|---|---|
| 2,579,414 | Boyd | Dec. 18, 1951 |
| 2,824,114 | Bostwick | Feb. 18, 1958 |